United States Patent [19]

Houser

[11] Patent Number: 4,803,952
[45] Date of Patent: Feb. 14, 1989

[54] PORTABLE SHELTER FOR SMALL ANIMALS

[76] Inventor: David B. Houser, 5136 E. Evergreen St. #1079, Mesa, Ariz. 85205

[21] Appl. No.: 70,070
[22] Filed: Jul. 6, 1987
[51] Int. Cl.⁴ .............................................. A01K 1/03
[52] U.S. Cl. .................................................... 119/19
[58] Field of Search ............................ 119/16, 19, 23; 446/476, 478

[56] References Cited

U.S. PATENT DOCUMENTS

| | | | |
|---|---|---|---|
| 3,016,042 | 1/1962 | Curn Jr. ................................ | 119/19 |
| 3,108,569 | 10/1963 | Kundikoff .............................. | 119/19 |
| 3,418,976 | 12/1968 | Vail ...................................... | 119/23 |
| 3,522,904 | 8/1970 | Locke et al. ......................... | 119/19 X |
| 3,703,159 | 11/1972 | Rose-Miller ........................... | 119/19 |

FOREIGN PATENT DOCUMENTS 358183  9/1922  Fed. Rep. of Germany ...... 446/478

*Primary Examiner*—Robert P. Swiatek
*Attorney, Agent, or Firm*—Richard R. Mybeck

[57] ABSTRACT

A portable shelter for small animals such as cats. The shelter is formed in modular assemblies which are readily assembled into a two story condominium having segregated toilet, resting and watching areas. The shelter provides unique territory and positive psychological reinforcement for the pet occupant.

16 Claims, 3 Drawing Sheets

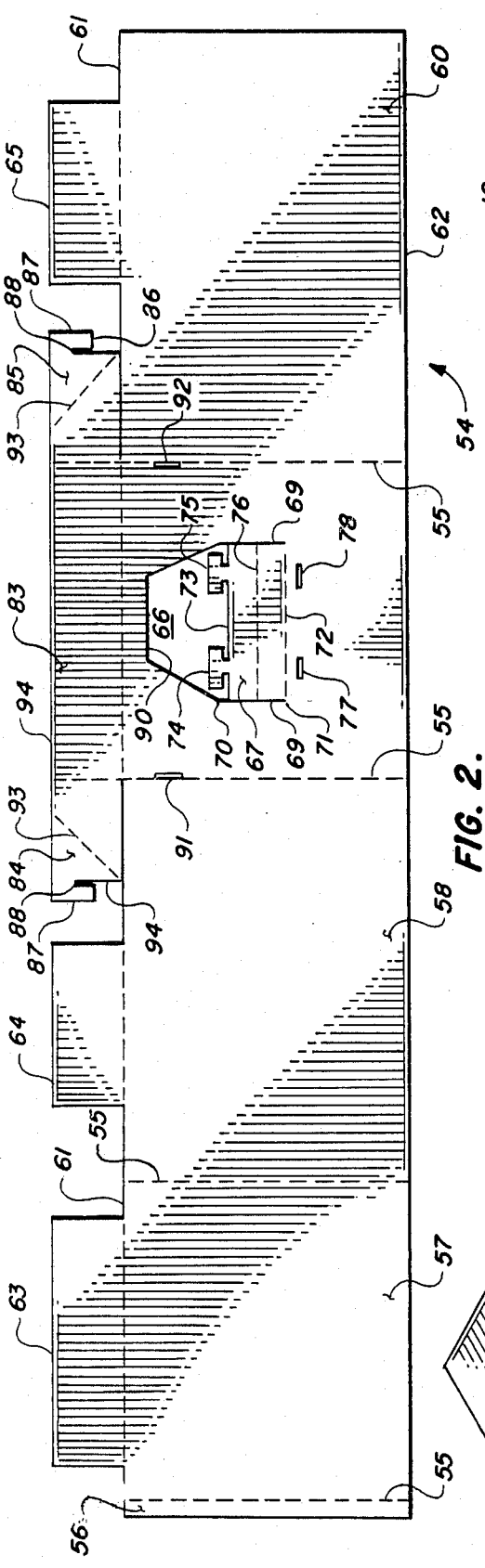
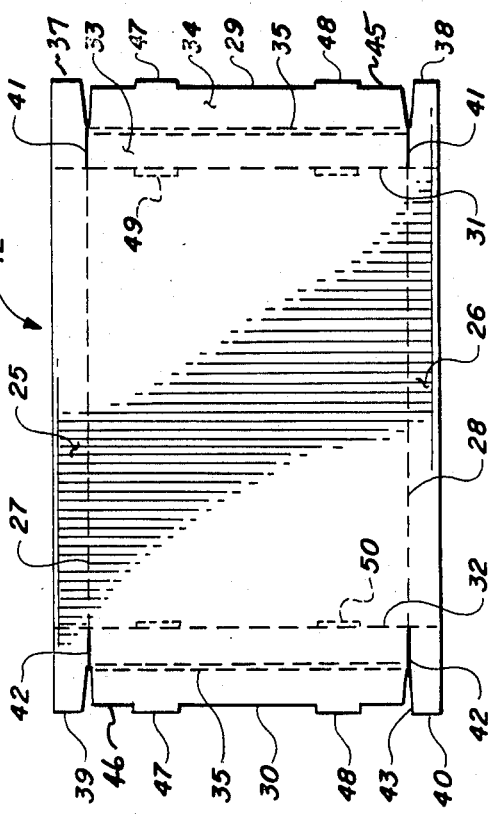
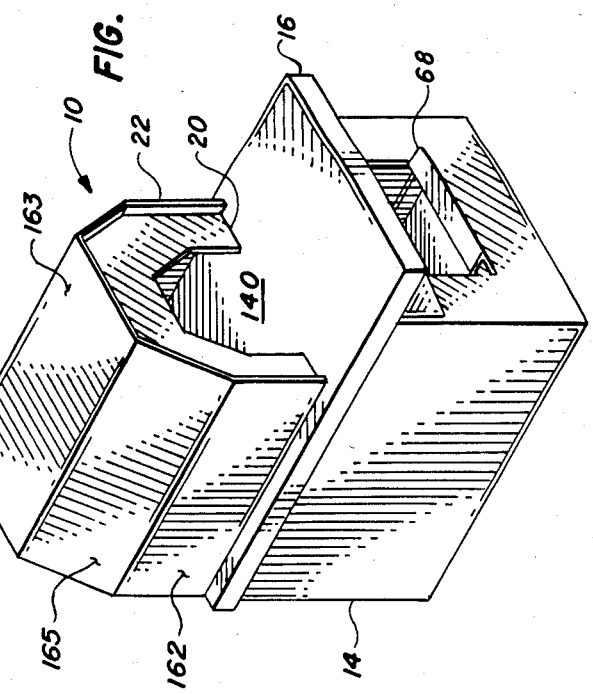

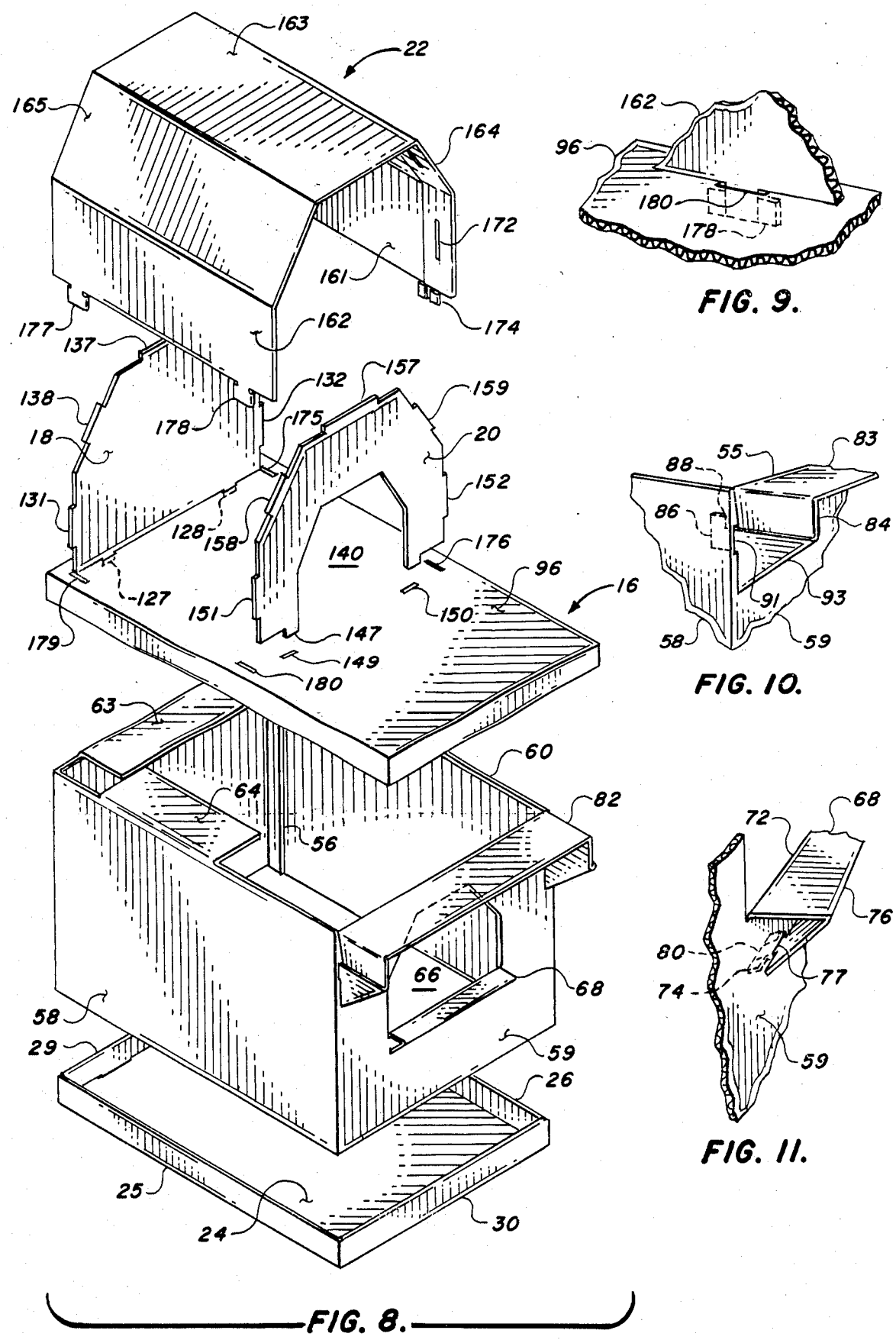

PORTABLE SHELTER FOR SMALL ANIMALS

The present invention relates to a portable shelter for small animals and more particularly to a shelter for small domestic animals such as cats which are normally housed and maintained in the human habitat.

BACKGROUND OF THE INVENTION

The housecat (Felis domesticus) is often chosen as a pet because of its intelligence and personality. The cat's intelligence allows training and the ability to adapt to the human household. The adaption of the cat requires the presence of humans who form the cat's family group, much the same as the family group of animals found in the natural state. The physical household and the yard areas form the cat's territory and is shared with the human family group. The responsibility attached to cat ownership includes the provision of proper nutrition, clean and detached litter areas, and comfortable sleeping, resting, or watching accommodations.

The provision of a resting and eating facility in a room of the host house establishes the area limit to the cat as far as these particular activities are concerned. If within the same area a "cat box" is included, the entire area is considered to be feline territory and may be a source of objectionable odors as well as food and water spillage. The most objectionable problem is the psychological torment of the owners and the behavioral non-compliance of the cat when efforts are made to change or eliminate the undesirable features. Odor control is an especially vexing problem for which a variety of solutions have heretofore been proposed such as litter boxes, specially treated sand or pellets for use within the litter box, extremely pungent and heavily scented air freshners and the like.

Each of the prior solutions, while addressing the immediate problem at hand with some degree of success, also give rise to new and sometimes more serious problems for which no solution was presented. For instance, a soiled litter box could appear as an attractive sand pile to an unwary toddler, the chemicals employed to treat the sand or pellet filler could cause adverse reactions upon ingestion by or contact with a sensitive human and heavily scented air freshners are well recognized as a source of allergenic reactions.

The present invention is directed to the solution of the foregoing problems in a manner which provides a positive overall psychological impact on the feline having the use thereof, by providing a lair containing all the necessities as well as a resting, climbing, and watching platform which provides interest and physical activity to the occupant. By the provision of an activity area to prevent boredom, the concealed lair for resting and observation provides an interesting pastime that reduces or eliminates the tendency for destructive behavior often found with animals left alone in isolation.

BRIEF SUMMARY OF THE INVENTION

The present invention comprises an integrated housecat apartment containing a rest room, a separate resting quarters, and a remote feeding and watering place. The entire housing unit is modular form for easy step by step assembly to provide the essential elements for owner and pet satisfaction. The entire unit is provided in an economical and affordable disposable form.

Accordingly, a prime object of the present invention is to provide a new and improved shelter for small animals which is inexpensive, portable and readily assembled in any location.

Another object of the present invention is to provide an improved shelter especially designed to provide unique territory for and positive psychological reinforcement to the everyday life of a cat.

A further object of the present invention is to provide a clearly identifiable feline domain which can be readily incorporated into a human habitat while maintaining a pleasant and harmonious relationship therebetween.

Still a further object of the present invention is to provide a pet lair in which all of life's necessities are combined in a facility which provides interest and physical activity to the occupant thereby reducing the tendency of the animal housed therein to engage in destructive behavior.

These and still further objects as shall hereinafter appear are readily fulfilled by the present invention in a remarkably unexpected manner as will be readily discerned from the following detailed discription of an exemplary embodiment thereof especially when read in conjunction with the accompanying drawing in which like parts bear like numerals throughout the several views.

BRIEF DESCRIPTION OF DRAWINGS

In the drawing:

FIG. 1 is an isometric view of a portable small animal shelter embodying the present invention;

FIG. 2 is a plan view of the first story assembly of the present invention;

FIG. 3 is a plan view of a base assembly embodying the present invention;

FIG. 8 is an exploded isometric view of the several assemblies and members comprising the present invention; and FIGS. 9, 10, and 11 are fragmented isometric views of various tab-locking arrangements embodied in the present invention.

DESCRIPTION OF PREFERRED EMBODIMENT

Figures 4, 5, 6:
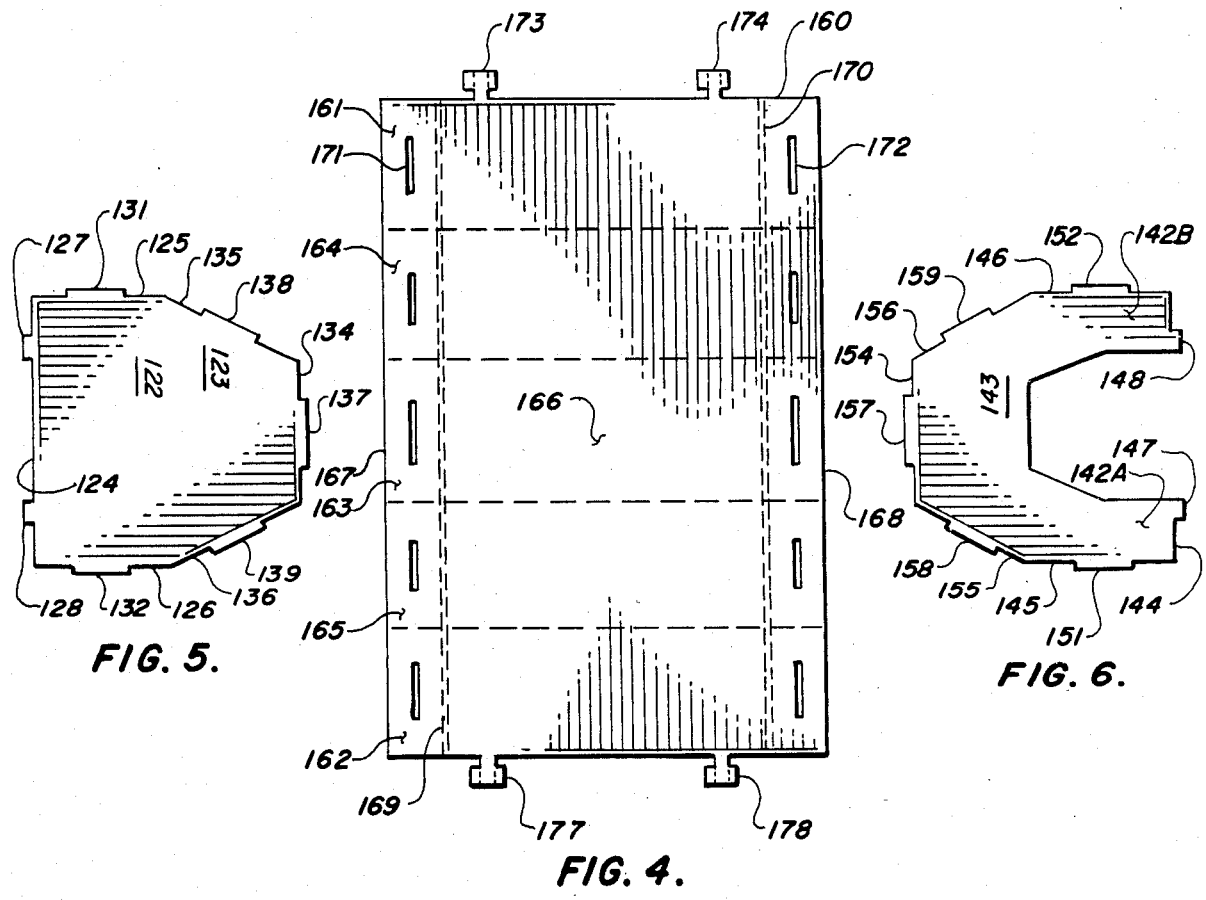
FIG. 4 is a plan view of a roof assembly embodying the present invention.
FIG. 5 is an end elevation of a rear wall member embodying the present invention.
FIG. 6 is an end elevation of a front wall member embodying the present invention.

Referring to the drawing, and particularly FIGS. 1-8, the portable animal shelter of the present invention, indicated by the general reference 10, comprises a base assembly 12, a first story assembly 14, an intermediate assembly 16, a rear wall member 18, a front wall member 20, and a roof assembly 22, each operatively associated with the member of assembly adjacent thereto to create a portable shelter 10 (See: FIGS. 1-8) as will now be described in detail.

Base assembly 12 (See FIG. 3) comprises a generally flat body portion 24 having a first side member 25 and a second side member 26 each formed contiguous therewith in longitudinally axially extending relationship along a different edge of said body portion 24 and having a fold line 27, 28 operatively interposed therebetween. First and second end members 29, 30, are respectively disposed at each end of body portion 24 and have a fold line 31, 32 interposed between the respective end member 29, 30 and body portion 24.

Each end member, for example end member 29, comprises an inner panel 33, adjacent fold line 31, and an outer panel 34 sharing a common fold line 35 therebetween. As shown in FIG. 4, fold lines 31, 32 extend transversely across side members 25, 26 to create flaps 37, 38, 39, 40 therewith out board thereof which are further separated from end members 29, 30 by a discrete cut 41 between each of the flaps 37, 38 and the end member 29 adjacent thereto and a discrete cut 42 between each of the flaps 39, 40 and the end member 30 adjacent thereto.

In a preferred embodiment, as shown in FIG. 3, each flap, for example, flap 37, will have the corresponding cut, for example cut 41, widened at the outer portion thereof to create an angular surface 43 thereupon extending from fold line 35 in diverging relationship thereto, the purpose of which will be hereinafter explained.

On the outer edge 45 of end member 29 and on the outer edge 46 of end member 30 are defined first and second tab members 47, 48 respectively, which are disposed in spaced registered relationship with a pair of slot means 49, 50 which are defined on fold lines 31, 32.

To assemble base assembly 12, body portion 24 is placed on a flat surface such as a table or the floor and side members 25, 26 are raised on fold lines 27, 28, respectively, until each side member is essentially normal to body portion 24. Next flaps 37, 38, 39 and 40 are each folded at right angles to the plane of the corresponding side member 25, 26, and maintained in this position while end members 29, 30 are respectively raised on fold lines 31, 32 until each end member 29, 30 is generally normal to body portion 24.

Next, reference being had to end member 29 as exemplary, outer panel 34 is folded on fold line 35 over flaps 37, 38 and downwardly until tabs 47, 48 are respectively engaged in corresponding slot means 49, 50. End member 30 is similarly folded over flaps 39, 40 until tabs 47, 48 are engaged into slot means 49, 50 thus completing the erection of base assembly 12 which can now be placed on a suitable surface such as the floor with body portion 24 in surface-to-surface engagement therewith.

First story assembly 14, as shown in FIGS. 1, 2 and 8, comprises an elongated body portion 54 having a plurality of vertically extending fold lines 55 formed therein which coact therewith to define a seam panel 56, a rear panel 57, a first side panel 58, a front panel 59, and a second side panel 60, each of which extend between an upper edge 61 and a lower edge 62.

Superjacent to panel 57 and foldable on edge 61 is a rectangular support member 63 which coacts with support members 64, 65 formed superjacent panels 58, 60, respectively, and likewise foldable on edge 61.

Front panel 59 is unique and will now be described. A suitable opening 66 is formed centrally within panel 59 which may be cut to any suitable shape such as the pentagonal opening shown, or circular or other desired shape of sufficient size to permit the comfortable passage of a domestic pet therethrough. In forming opening 66, a substantial portion 67 of the opening is shaped, but not removed, to create a threshold 68 in the following manner.

A side cut 69 is made at each edge of portion 67 from a point 70 in the opening 66 to a second point 71 which coacts with the like point of the second edge to define a first fold line 72. Portion 67 is further shaped to create an upper edge 73 having a first and second T-shaped tab 74, 75, respectively, extending therefrom in spaced relationship to each other. A second fold line 76 is created in portion 67 midway between fold line 72 and upper edge 73 and generally parallel therewith.

Beneath fold line 72 in panel 59, first and second slot means 77, 78 are disposed in spaced aligned relationship with each other and in substantially registered relationship with the stem-portion 79 of a corresponding T-shaped tab 74, 75. Slot means, for example, slot means 77 are provided with sufficient height to enable a T-shaped tab, e.g. 74, to pass therethrough when the free ends of cross bar 80 are folded inwardly upon themselves for passage through slot 77 and sufficiently narrow to prevent the inadvertent withdrawal of crossbar 80 from within slot 77 once penetration has been achieved and the ends are unfolded as shown more particularly in FIG. 11.

Porch support member 82 is formed contiguous to and above panel 59 for folding outwardly on edges 61 and comprises a central portion 83, a left wing portion 84, and a right wing portion 85. Central portion 83 is integral with front panel 59 while wing portions 84, 85, which as seen in FIG. 2, are disposed above side panels 58, 60, respectively, are free moving relative to the side panel adjacent thereto.

Fold lines 55 created at each edge of panel 59 extend upwardly across support member 82 and provide a means to pivot wing portions 84, 85 relative to central portion 83.

Each wing portion, for example, wing portion 84, is provided with a finger portion 86 extending downwardly from the distal edge 87 thereof approximately half-way toward edge 61 and has a cut 88 interposed between finger portion 86 and the main body portion 84 of the wing 84.

On fold lines 55 at each edge of panel 59 and approximately aligned with the upper edge 90 of opening 66, first and second vertically extending slot means 91, 92 are defined, the purpose of which shall be hereafter described.

Finally each wing portion, for example wing portion 84 is provided with a diagonally disposed fold line 93 extending from the distal edge 87 of wing 87 upwardly and inwardly to intersect with the upper edge 94 thereof adjacent fold line 55.

To erect first story assembly 14, body portion 54 is folded on fold lines 55 into a rectangular frame with seam panel 56 overlapping second side panel 60 and secured thereto in any suitable fashion as with glue, paste, cement, staples or the like.

Next, as shown in FIG. 8, support members 64, 65 are folded inwardly on the fold line provided by edge 61 until they are substantially normal to their corresponding side panels 58, 60, respectively, and support member 63 is then folded on edge 61 into engagement with members 64, 65 and secured thereto using the same means as employed to secure seam panel 56, if desired.

Threshold 68 is formed beneath doorway 66 by folding portion 67, first on fold line 72 outwardly from panel 59, and then on fold line 76 to bring T-shaped tabs 74, 75 into operative relationship with slot means 77, 78, respectively.

The free ends 81 of cross bars 80 of the T-shaped tabs 74, 75 are momentarily folded upon each other for insertion into the corresponding slot, that is, tab 74 goes into slot 77 and tab 75 goes into slot 78, whereupon the free ends 81 are unfolded and serve to lock tabs 74, 75 within their respective slots 77,78. When the threshold 68 is thus assembled, it is apparent that the ingress/e- gress via opening 66 extends vertically from the upper edge 90 as shown down to threshold 68.

The final sequence to complete the erection of first story assembly 14 involves securing porch support member 82 in its desired location. First wing portions 84, 85 are respectively folded on fold line 55 until each extends outwardly into substantially perpendicular relationship to central portion 83. Then, central portion 83 is folded on edge 61 until it extends outwardly from and in generally normal relationship to front panel 59. Finally, each wing member 84, 85 is folded on its diagonal fold line 93 which brings finger portions 86 into engageable relationship with slots 91, 92 and so engaging them therewithin to secure porch support member 82 thereto as shown in FIG. 10.

Thus assembled, the first story assembly 14 can be placed in circumscribing relationship to base assembly 12 to continue the erection of shelter 10.

Figure 7:
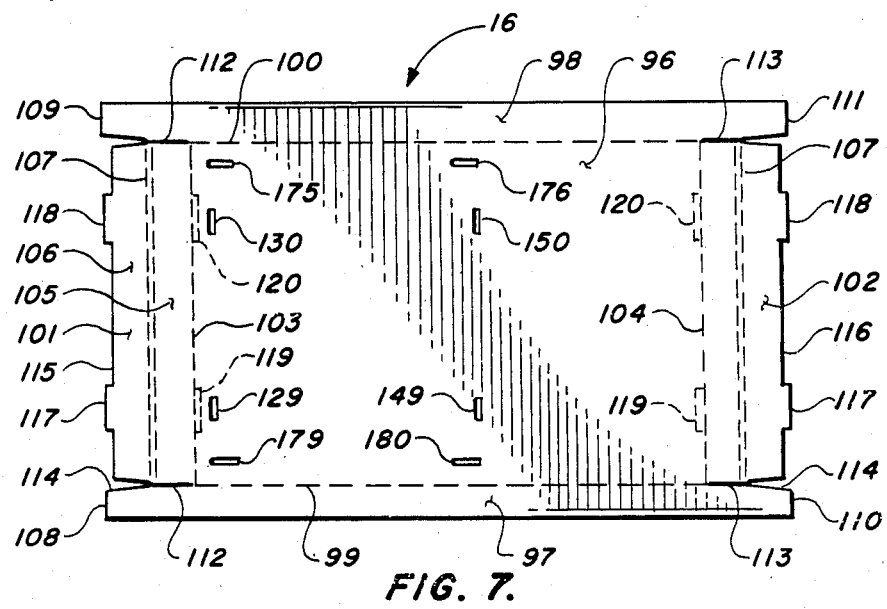
FIG. 7 is a plan view of the intermediate assembly embodying the present invention.

Intermediate assembly 16, as shown in FIGS. 1, 7 and 8, provides the ceiling for first story assembly 14 and the floor and porch arrangement for the second story assembly and will now be described.

Referring to FIG. 7, intermediate assembly 16 comprises a generally flat body portion 96 having a first side member 97 and a second side member 98, each formed contiguous therewith inlongitudinally axially extending relationship along a different edge of said body portion 96 and having a fold line 99, 100 operatively interposed therebetween. First and second end members 101, 102 are respectively disposed at each end of body portion 96 and have a fold line 103, 104 interposed between the respective end members 101, 102 and body portion 96.

Each end member, for example, end member 101, comprises an inner panel 105 adjacent fold line 103 and an outer panel 106 sharing a common fold line 107 therewith and therebetween.

As shown in FIG. 7, fold lines 103, 104 extend transversely across side members 97, 98 to create flaps 108, 109, 110, 111 therewith out board thereof which are further separated from end members 101, 102 by a discrete cut 112 between each of the flaps 108, 109 and the end member 101 adjacent thereto and a discrete cut 113 between each of flaps 110, 111 and the end member 102 adjacent thereto.

In a preferred embodiment, as shown in FIG. 7, each flap, for example flap 108, will have the corresponding cut, for example, cut 112, widened at the outer portion thereof to create an angular surface 114 thereupon extending from fold line 107 in diverging relationship thereto, the purpose of which will be hereinafter explained.

On the outer edge 115 of end member 101 and on the outer edge 116 of end member 102 are defined first and second tab members 117, 118, respectively, which are disposed in spaced registered relationship with a pair of slot means 119, 120 which are defined on fold lines 103, 104.

To assemble intermediate assembly 16, body portion 96 is placed on a flat surface such as a table or the floor and side members 97, 98 are raised on fold lines 99, 100, respectively, until each side member is essentially normal to body portion 96. Next flaps 108, 109, 110 and 111 are each folded at right angles to the plane of the corresponding side member 97, 98 and maintained in this position while end members 101, 102 are respectively raised on fold lines 99, 100 until each end member 100, 101 is generally normal to body portion 96.

Next, reference being had to end member 101 as exemplary, outer panel 106 is folded on fold line 107 over flaps 108, 109 and downwardly until tabs 117, 118 are respectively engaged in corresponding slot means 119, 120. End member 102 is similarly folded over flaps 110, 111 until tabs 117, 118 are engaged into slot means 119, 120 thus completing the erection of intermediate assembly 18 which can now be placed upon first story assembly 14 and seated thereupon.

Rear wall member 18 (See: FIG. 5) and front wall member 20 (See: FIG. 6) coact to define sleeping quarters on the second floor of the shelter 10 and to support roof assembly 22.

Each wall member, for example, rear wall member 18, comprises a rectangular bottom portion 122 and a trapezoidal upper portion 123 integrally formed therewith. Bottom portion 122 has a bottom edge 124, a first side edge 125 and a second side edge 126.

Bottom edge 124 has a first tab member 127 and a second tab member 128 depending therefrom in spaced relationship to each other for insertion into slot members 129, 130 defined adjacent end member 101 of body portion 96 of intermediate assembly 16 (See: FIG. 7) in registered engaging relationship to tabs 127, 128, respectively.

Each side edge 125, 126 is respectively provided with an outreaching tab 131, 132, the function of which will be hereinafter described.

Trapezoidal upper portion 123 has an upper edge 134 connected to bottom portion 122 by first and second obliquely diverging side edges 135, 136, respectively. Outreaching tab members 137, 138, 139 are respectively provided on each of edges 134, 135, 136 approximately in the center thereof, for a purpose to be described.

Front wall member 20 is essentially identical to rear wall member 18 except that a suitable opening 40 is cut or otherwise defined in the bottom portion thereof to permit egress/ingress into the quarters defined therebehind as will hereafter appear. In order to avoid confusion in assembly, however, the several portions of wall member 20 are assigned distinct indicia. Thus, front wall member 20 comprises a bottom portion 142 and a trapezoidal upper portion 143 integrally formed therewith. Bottom portion 142 has a bottom edge 144, a first side edge 145, and a second side edge 146.

Bottom edge 144 has a first tab member 147 and a second tab member 148 depending therefrom in spaced relationship to each other for insertion into slot members 149, 150 defined adjacent the trasverse midline of body portion 96 of intermediate assembly 16 (See: FIG. 7) in registered engaging relationship to tabs 147, 148, respectively.

Each side edge 145, 146 is respectively provided with out reaching tabs 151, 152, the function of which will be hereinafter described.

Trapezoidal upper portion 143 has an upper edge 154 connected to bottom portion by first and second obliquely diverging side edges 155, 156, respectively. Outreaching tab members 157, 158, 159 are respectively provided on each of the edges 154, 155, 156, approximately in the center thereof, for a purpose to be hereinafter described.

While the analogy between bottom portion 122 of wall member 18 and bottom portion 142 of wall member 20 is somewhat clouded by the provision of opening 140 therewithin (which creates two visible parts 142A and 142B), the assembly thereof is clearly understood in defining that portion as a single entity identified as 142.

Rear wall member 18 is mounted upon intermediate member 16 by inserting rear member tabs 127, 128 into slots 129, 130, respectively. Front wall member 20 is similarly installed upon intermediate member 16 by inserting from member tabs 147, 148 into slots 149, 150, respectively (See: FIG. 8) as mounted wall members 18, 20 extend substantially normal from body portion 96 in spaced parallel relationship to each other.

Roof assembly 22, as shown in FIGS. 1, 4, and 8, comprises an articulated body member 160 formed of a plurality of generally rectangular panels, namely, end panels 161, 162, center panel 163, and intermediate panels 164, 165. Each panel, for example panel 163, has a center portion 166, a first and second end portion 167, 168, and a first and second fold line 169, 170. As shown in FIG. 4, fold lines 169, 170 extend longitudinally the entire length of body member 160 in generally parallel relationship to each other to allow end portion 167 and each of its counterparts in the several panels to be folded under center portions 166 on the one side and end portion 168 and each of its counterparts in the several panels to be folded under center portions 166 on the other side thereof for a purpose which will now be described.

As is shown in FIG. 4, each end portion 167, and its several counterparts are provided with a longitudinally extending slot 171 in the approximate center thereof while end portion 168 and its several counterparts are provided with a similar slot 172 in the approximate center thereof.

The several slots 171, 172, when end portions 167, 168 are turned under as previously described, provides seating means for the roof assembly 22 during assembly as will be described.

End panel 161 is provided with a pair of outwardly extending T-shaped tabs 173, 174 disposed in spaced relationship to each other and insertable respectively into for locking engagement with slots 175, 176 formed in body portion 96 of intermediate assembly 16 adjacent fold line 100. In a like fashion, end panel 162 is provided with a pair of outwardly extending T-shaped tabs 177, 178 disposed in spaced relationship to each other and insertable respectively into for locking engagement with slots 179, 180 formed in body portion 96 of intermediate assembly 16 adjacent fold line 99.

To install roof assembly 22 onto upstanding wall members 18, 20, one procedure involves inserting T-shaped tabs 177, 178 into slots 179, 180, respectively, folding and unfolding the T-cross bars in the manner previously described to lock the tabs therewithin as is shown in FIG. 9.

Next body member 160 is laid upon across the upper perimeter of wall members 18, 20 in such a way that one of slots 172 engages a different one of the several tabs 151, 158, 157, 159 and 152 protruding outwardly from front wall member 20 while one of the slots 171 engages a different one of the several tabs 131, 138, 137, 139 and 132 protruding outwardly from rear wall member 18 and thereafter snap-fitting T-shaped tabs 173, 174 into slots 175, 176, respectively.

Thus assembled, a convenient portable shelter 10 has been created which, when a conventional litter box (not shown) is disposed in base assembly 12, provides a first floor "bathroom". The upper chamber created by the coaction of intermediate assembly 16 with rear wall member 18, front wall member 20 and roof assembly 22 provides sleeping quarters whereas the porch provided by intermediate assembly 16 outside of the sleeping room and reinforced by member 82 provides a comfortable place for the pet to lay and ponder his surroundings. Food and water can be served on the porch thereby keeping the eating and waste functions separated.

The structure herein described and illustrated is preferably formed of corrugated paper, cardboard and the like which can be readily sealed or waterproofed as the exigencies may require.

From the foregoing, it is readily apparent that the invention herein described and illustrated fulfills all of the aforestated objectives in a remarkably unexpected manner. It is, of course, understood that such modifications, alterations and adaptations, as may readily occur to the artisan skilled in the field to which this invention pertains when confronted with this specification, are intended within the spirit of the present invention which is limited only by the scope of the claims appended hereto.

Accordingly, what is claimed is:

1. A portable animal shelter comprising a base assembly; a first story assembly seated in said base assembly and extending upwardly therefrom; a rear wall member; a front wall member; a roof assembly; and an intermediate assembly seated upon said first story assembly and having means defined therein for supporting said rear wall member and said front wall member in upstanding secure relationship, said roof assembly extending between said rear wall member and said front wall member in overlying relationship thereto and in interlocking relationship with said intermediate member, said first story assembly having an elongated body portion having a plurality of vertically extending fold lines formed therein creating a seam panel, a rear panel, a first side panel, a front panel, and a second side panel therewith, said body portion being foldable into a generally rectangular frame with said seam panel overlapping a portion of said second side panel and secured thereto, said frame having an upper edge for receiving said intermediate assembly thereupon, a lower edge for seating said frame, said front panel having an opening defined therein in communication with the interior of said frame.

2. A portable animal shelter according to claim 1, in which said rear wall member is attached to said intermediate assembly adjacent the rear edge thereof and said front wall member is attached to said intermediate assembly adjacent the transverse median line thereof to define, in cooperation with said roof assembly, an enclosed sleeping area on one portion of said intermediate assembly and an open porch on an another portion of said intermediate assembly.

3. A portable animal shelter according to claim 1 in which said base assembly comprise an elongated flat body portion having a first and second axially extending edge and a first and second transversely extending end, a first side member and a second side member, each disposed along a different one of said edges in folding relationship thereto, and a first end member and a second end member, each disposed along a different one of said ends of folding relationship thereto.

4. A portable animal shelter according to claim 3 in which each of said side members has a foldable flap at each end thereof which, when said side members are disposed in a generally normal relationship to said body portion, extend transversely thereacross for engagement by the adjacent one of said end members.

5. A portable animal shelter according to claim 4 in which each of said end members has an inner panel and an outer panel, said outer panel being foldable into engagement with said inner panel and having tab means thereon for locking engagement with said body portion when said inner panel and said outer panel are disposed in generally normal relationship to said body portion with adjacent ones of said flap members interposed therebetween.

6. A portable animal shelter according to claim 4 in which each of said end members has an inner panel and an outer panel, said outer panel being foldable into engagement with said inner panel and having tab means thereon for locking engagement with said body portion when said inner panel and said outer panel are disposed in generally normal relationship to said body portion with adjacent ones of said flap members interposed therebetween.

7. A portable animal shelter according to claim 1 in which said intermediate assembly comprises an elongated body portion having first and second axially extending edges and first and second transversely extending ends, a first side member and a second side member, each disposed along a different one of said side edges in folding relationship thereto, and a first and second end member, each disposed along a different one of said ends in folding relationship thereto, said side members and said end members coacting when folded to define a downwardly extending flange on the perimeter of said body portion for receiving said edge of said first story assembly therewith.

8. A portable animal shelter according to claim 7 in which said intermediate assembly includes means for securing said rear wall member, said front wall member and said roof assembly in a preselected relationship thereto.

9. A portable animal shelter according to claim 1 in which said roof assembly comprises an articulated body member having a first end panel, a second end panel disposed in spaced generally parallel relationship to said first end panel, and a plurality of intermediate panels operatively interposed between said first and said second end panel, each of said end panels having means extending outwardly therefrom for secure attachment to said intermediate assembly.

10. A portable animal shelter according to claim 1 in which the lower portion of said opening defines an upper and lower panel foldable outwardly therefrom relative to each other and attachable to said front panel beneath said opening to provide a threshold therefor.

11. A portable animal shelter according to claim 10 in which said base assembly comprises an elongated flat body portion having a first and second axially extending edge and a first and second transversely extending end, a first side member and a second side member, each disposed along a different one of said edges in folding relationship thereto, and a first end member and a second end member, each disposed along a different one of said ends in folding relationship thereto.

12. A portable animal shelter according to claim 11 in which each of said side members has a foldable flap at each end thereof which, when said side members are disposed in a generally normal relationship to said body portion, extend transversely thereacross for engagement by the adjacent one of said end members.

13. A portable animal shelter according to claim 12 in which each of said end members has an inner panel and an outer panel, said outer panel being foldable into engagement with said inner panel and having tab means thereon for locking engagement with said body portion when said inner panel and said outer panel are disposed in generally normal relationship to said body portion having adjacent ones of said flap members interposed therebetween.

14. A portable animal shelter according to claim 13 in which said intermediate assembly comprises an elongated body portion having first and second axially extending edges and first and second transversely extending ends, a first side member and a second side member, each disposed along a different one of said side edges in folding relationship thereto, and a first and second end member, each disposed along a different one of said ends in folding relationship thereto, said side members and said end members coacting when folded to define a downwardly extending flange on the perimeter of said body portion for receiving said edge of said first story assembly therewithin.

15. A portable animal shelter according to claim 14 in which said intermediate assembly includes means for securing said rear wall member, said front wall member and said roof assembly in a preselected relationship thereto.

16. A portable animal shelter according to claim 15 in which said roof assembly comprises an articulated body member having a first end panel, a second end panel disposed in spaced generally parallel relationship to said first end panel, and a plurality of intermediate panels operatively interposed between said first and said second end panel, each of said end panels having means extending outwardly therefrom for secure attachment to said intermediate assembly.

* * * * *